United States Patent

[11] 3,628,082

[72] Inventor Wolfgang Friedrich W. Dietz
New Hope, Pa.
[21] Appl. No. 6,122
[22] Filed Jan. 27, 1970
[45] Patented Dec. 14, 1971
[73] Assignee RCA Corporation

[54] LINEARITY CORRECTION CIRCUIT UTILIZING A SATURABLE REACTOR

12 Claims, 4 Drawing Figs.

[52] U.S. Cl. .......... 315/27 SR, 315/27 GD
[51] Int. Cl. .......... H01j 29/70
[50] Field of Search .......... 315/27 R, 27 SR, 27 TD, 27 GD

[56] References Cited

UNITED STATES PATENTS 3,566,181 2/1971 Figlewicz .......... 315/27 GD
3,571,653 3/1971 Hansen et al. .......... 315/27 GD

*Primary Examiner*—Rodney D. Bennett, Jr.
*Assistant Examiner*—J. M. Potenza
*Attorney*—Eugene M. Whitacre

ABSTRACT: A linearity correction circuit utilized in a horizontal deflection stage of a television receiver provides linearity correction by utilizing a nonlinear variable impedance comprising the parallel combination of a self-saturating saturable reactor and an inductor coupled in series with the horizontal yoke or deflection winding. A unidirectional conducting device is coupled in one of the parallel inductive circuit branches. As the yoke current changes polarity during each deflection cycle, the unidirectional conductive device switches the saturable reactor in and out of the circuit to provide the required linearity correction.

INVENTOR
Wolfgang F. W. Dietz
BY Eugene M. Whitacre
ATTORNEY

LINEARITY CORRECTION CIRCUIT UTILIZING A SATURABLE REACTOR

This invention relates to correction circuits used in kinescope deflection circuits and particularly to circuits for correcting linearity distortion in television display tubes.

In modern television receivers utilizing relatively wide angle deflection systems, it is desirable to have a linear scan velocity to provide a uniform raster, that is, one that does not exhibit compression or stretching of the displayed image. Due to the wide deflection angle in modern kinescopes, S-shaping techniques must be utilized to produce a deflection current which deviates from a perfectly linear waveform and which will provide a linear scan velocity. This S-shaping of the deflection current provides correction at the edges of the raster relative to the center portion. It is further necessary, however, to employ circuits commonly known as linearity correction circuits to correct for distortion of the left side of the raster relative to the right side of the raster. These circuits are required for at least two reasons. First, the internal resistance of the yoke winding produces a voltage in response to yoke current which effectively increases the yoke voltage during a first portion of scan when the yoke current is in a first direction and decreases the yoke voltage during the second portion of scan when the yoke current is in the reverse direction. Secondly, it is common in many deflection systems to employ separate conductive devices (e.g., a diode and an SCR) for yoke current during different portions of the trace interval. These devices frequently have differing conduction characteristics and compensation is required to provide a linear scan.

Certain prior art systems which have been employed to apply a corrective voltage to the yoke must be critically tuned to the deflection frequency (for example, 15,734 Hz ). Other known systems have employed saturable reactors coupled in series with the yoke to provide a corrective nonlinear impedance during the trace interval of each deflection cycle. These latter systems, however, utilize a saturable reactor employing a separate permanent magnet to provide the direct current bias flux necessary to enable the reactor to display the asymmetrical characteristics required. One such saturable reactor is described in U.S. Pat. No. 3,283,279 which is assigned to the present assignee. These circuits require that the permanent magnet be physically adjusted for proper operation. The circuit embodying the present invention, however, does not require such an adjustment, since a permanent magnet is not employed, rather, the asymmetrical nonlinear impedance change is obtained in the novel manner to be described below.

Circuits embodying the present invention include a deflection system which supplies a deflection current to a deflection yoke to control the scanning of an electron beam through successive trace and retrace intervals. An inductor and a saturable reactor coupled in parallel relationship to the inductor are connected in series with the deflection yoke. Switching means is provided for effectively opening the circuit of one of said inductors during a portion of the deflection interval.

Figures 1, 2, 3, 4:
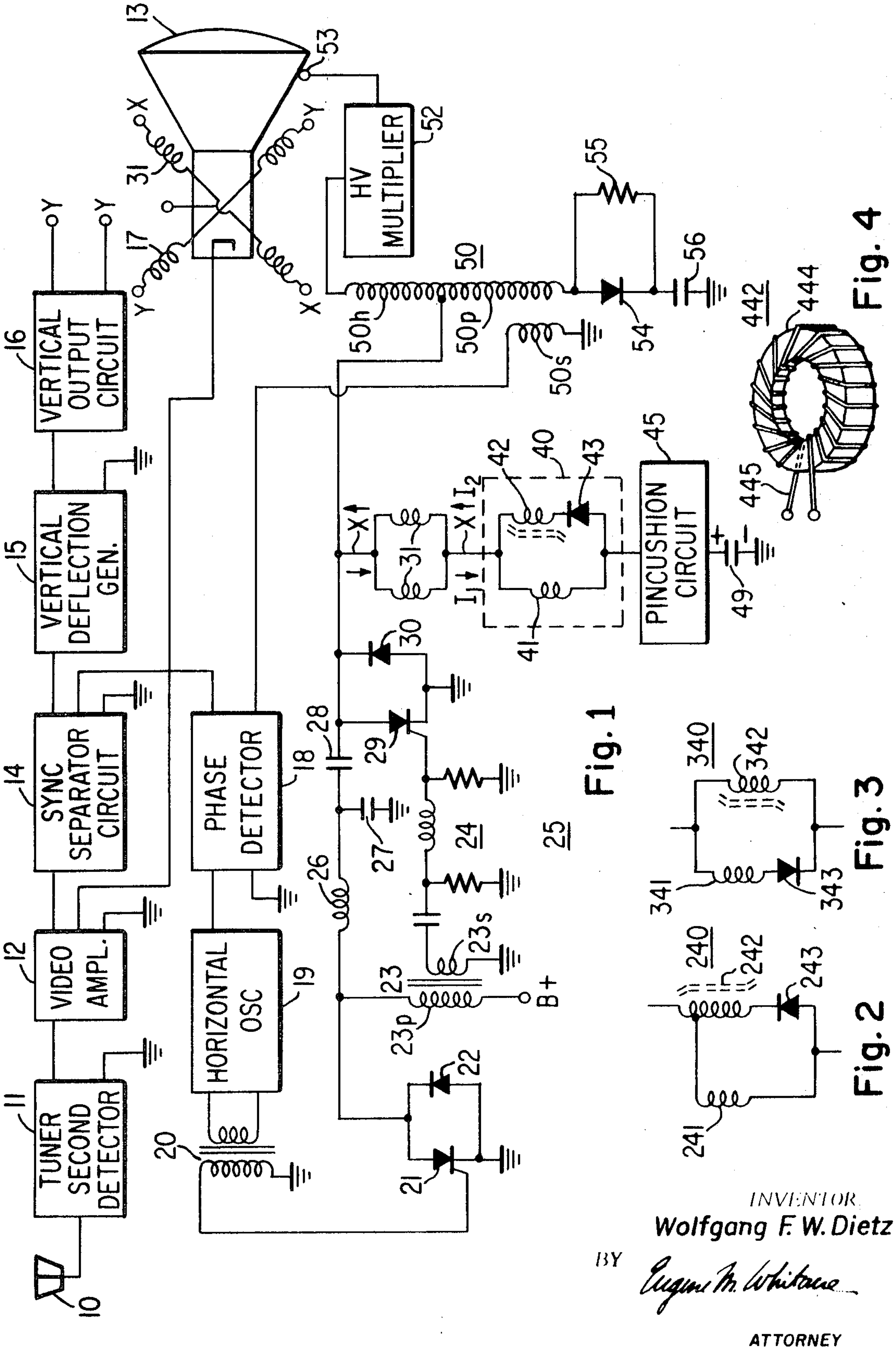
FIG. 1 is a schematic circuit diagram, partly in block form, embodying the present invention.
FIG. 2 is a schematic diagram of a modification of the linearity circuit of FIG. 1 embodying the present invention.
FIG. 3 is a schematic circuit diagram of another modification of the linearity correction circuit embodying the present invention.
FIG. 4 is a perspective view of a saturable reactor which can be employed in the circuitry of the present invention.

Referring to FIG. 1, the television receiver shown includes an antenna 10 which receives composite television signals and couples the received signals to a tuner-second detector 11. The tuner-second detector 11 normally includes a radiofrequency amplifier for amplifying the received signals, a mixer-oscillator for converting the amplified radio frequency signals to intermediate frequency signals, an intermediate frequency amplifier and a detector for deriving composite television signals from intermediate frequency signals. The television receiver further includes a video amplifier 12.

The amplified image brightness representative portion of the composite television signal amplified by video amplifier 12 is applied to the control electrode (e.g., the cathode) of a television kinescope 13. The composite television signal is also applied from video amplifier 12 to a synchronizing signal separator circuit 14. The sync separator circuit 14 supplies vertical synchronizing pulses to a vertical deflection signal generator 15. Vertical deflection generator 15 is connected to a vertical deflection output circuit 16, terminals Y—Y of which are connected to a vertical deflection winding 17 associated with kinescope 13.

Horizontal synchronizing pulses are derived from sync separator 14 and are supplied to a phase detector 18, the latter also being supplied with a second signal related in time occurrence to the operation of a horizontal oscillator 19. An error voltage is developed in phase detector 18 and is applied to horizontal oscillator 19 to synchronize the output of the latter with the horizontal synchronizing pulses. The output signal developed by horizontal oscillator 19 is supplied by means of a transformer 20 to a horizontal deflection circuit 25.

A deflection circuit 25 of the type shown is described in detail in my U.S. Pat. NO. 3,452,244 assigned to the present assignee; a brief description is however included here. The deflection circuit comprises a bilaterally conductive trace switching means including a silicon controlled rectifier (SCR) 29 and a parallel coupled diode 30. The trace switching means couples a relatively large storage capacitor 49 across a deflection winding 31 during the trace portion of each deflection cycle. A first capacitor 28 and a commutating inductor 26 are coupled between the trace switching means and a bilaterally conductive commutating switching means which includes an SCR 21 parallel coupled to a diode 22. A second capacitor 27 is coupled from the junction of capacitor 28 and inductor 26 to ground. A voltage supply B+ is coupled to a relatively large supply inductor 23 which is further coupled to the junction of commutating inductor 26 and the commutating switching means 21, 22.

An output transformer 50 having a primary winding 50*p* is coupled across the combination of deflection winding 31, a linearity correction circuit 40, a pincushion correction circuit 45 and capacitor 49. A secondary winding 50*s* is coupled to phase detector 18 for providing flyback or retrace pulses to phase detector 18 for controlling the operation of oscillator 19. A high voltage winding 50*h* provides voltage pulses to a high voltage multiplier 52 which is further coupled to the ultor electrode 53 of kinescope 13 for providing a substantial voltage (e.g., 20–27,000 volts) for acceleration of the electron beam in kinescope 13. The low-voltage end of primary winding 50*p* is coupled to ground by means of a protection circuit including a diode 54, a resistor 55, and a capacitor 56.

The linearity correction circuit 40 comprises a self-saturating saturable reactor 42 coupled in series with a unidirectionally conductive device such as diode 43, the series combination 42, 43 being coupled in parallel relation with an inductor 41. The parallel combination 41, 42, 43 is coupled in series relation with deflection winding 31 and capacitor 49.

Having thus described the circuit, the operation of the invention included therein follows. When the trace interval of each deflection cycle is initiated, current flowing in yoke 31 is at a maximum value due to the prior circuit action involving resonant energy exchanges between inductors 23 and 26, capacitors 27 and 28, the high voltage circuit 52 and the deflection winding 31. The current at this time is in a first direction illustrated by the arrow accompanying the symbol $I_1$ in FIG. 1. At this time (the beginning of trace), diode 30 completes the yoke conduction path which includes the linearity circuit 40, pincushion circuit 45 and capacitor 49. It is seen that, since the yoke current is at a maximum value and decreasing towards zero at the instant of trace initiation, the resistive voltage drop due to the yoke resistance is at a maximum, and of a polarity to add to the voltage across capacitor

49 which has a charge of polarity indicated in the diagram. The effective yoke voltage also is increased by the conductive voltage drop across diode 30. Neglecting the effect of pincushion circuit 45 and linearity circuit 40, the effective yoke voltage, at its maximum when trace is initiated, is in a direction which tends to oppose the flow of current $I_1$. Typically, the yoke resistance is approximately 0.4 ohms and the peak-to-peak yoke current in the order of 7 amperes. Thus, the yoke resistance produces a peak-to-peak voltage of 2.8 volts which combines with the applied yoke voltage to produce in part the linearity distortion. The forward voltage drops of SCR 29 and diode 20 also combine with the applied yoke voltage to increase the linearity distortion.

Just prior to the initiation of the trace interval (i.e., during the latter portion of the retrace interval) diode 43 is reverse biased and nonconducting thereby preventing current flow through reactor 42. Thus when the trace interval begins, reactor 42 is unsaturated and presents a relatively large impedance and current $I_1$ flows primarily through inductor 41. The linearity correction circuit 40 appears as a relatively constant inductor during this interval. As $I_1$ decreases towards zero, the resistive voltage drop reduces, thus producing virtually no linearity distortion. As the midpoint of trace is reached, $I_1$ has diminished to zero, the charge on capacitor 49 is at a maximum and conduction is about to transfer from diode 30 to SCR 29.

Near the midpoint of trace, which corresponds to the middle of the scanned raster, SCR 29 is triggered into conduction by means of trigger circuit 24 which is supplied a trigger voltage by means of winding 23*s* on input reactor 23. As the second portion of the trace interval begins, capacitor 49 supplies energy to the yoke and the current path includes pincushion circuit 45, linearity circuit 40, yoke 31 and SCR 29. Current in yoke 31 during the second portion of trace is in a direction illustrated by the arrow accompanying the symbol $I_2$ (i.e., opposite to the direction of $I_1$ ). The resistive voltage drop due to the yoke resistance is now in a direction which tends to oppose the voltage across capacitor 49 and thereby decreases the effective voltage across the yoke with increasing yoke current. Furthermore, the voltage drop across SCR 29 is also in a direction to reduce the effective yoke voltage. To compensate for the asymmetrical effect of the resistive voltage drop in the yoke as well as the different conduction characteristics of SCR 29 and diode 20; linearity correction circuit 40 provides, during the second portion of trace, a smaller total inductance which changes in a nonlinear fashion. As yoke current increases during the second portion of trace, diode 43 conducts an increasing amount of current through saturable reactor 42. Reactor 42 is designed such that it is self-saturating and will, during the second portion of scan, begin to change in a nonlinear fashion to modify the yoke current in the required proportion. The exact crossover point, that is, the point at which the reactor begins saturating is determined by the value of inductor 41 as well as the design of reactor 42. Toward the end of the trace interval, when $F_2$ increases towards its maximum value, circuit 40 presents a nonlinearly decreasing inductance. This change in inductance compensates for the effective decrease in voltage across yoke 31 due to the resistive voltage drop therein. Inductor 41 can be made variable to provide the linearity adjustment needed for proper linearity correction. Also, linearity correction circuit 40 can be modified to change its characteristics as is represented in FIGS. 2 and 3.

Referring to FIG. 2, the corresponding circuit elements are numbered in accordance with the numbers of FIG. 1 preceded by the numeral 2. In FIG. 2, inductor 241 is coupled to a tap slightly below the top of reactor 242. This modification of the circuit 40 shown in FIG. 1 makes the crossover point less sensitive to peak yoke current, since the yoke current flows in a portion of reactor 242 during both periods of the trace interval.

Referring to FIG. 3, diode 343 is coupled in series with the linear inductor 341 and conducts during the first portion of the trace interval. The configuration provides a crossover point very near the center of trace, since during the second portion of trace, reactor 342 conducts nearly all of the yoke current whereas reactor 42 in FIG. 1 conducts only a portion of the yoke current during the second portion of the trace interval. Reactor 342 therefore saturates at an earlier time in the deflection cycle.

The physical construction of saturable reactor 42 in FIG. 1 is shown in FIG. 4 as element 442. The core member 444 is toroidal in form and winding 445 is distributed around its periphery. Other core forms having a closed magnetic path can also be employed.

The present invention, although shown in an SCR deflection circuit in the preferred embodiment, has equal applicability in other type of circuits, such as those employing transistors or vacuum tubes.

In the preferred embodiment, inductor 40 is an inductor of 80 microhenries, while saturable reactor 42 comprises 24 turns of No. 23 wire around a ferrite core of toroidal form. Reactor 42 has an inductance of 1.1 millihenries with 10 milliamperes of current flowing and an inductance of 40 microhenries with 3 amperes flowing in its winding. Diode 43 may, for example, be an RCA type 40642. The remainder of the deflection circuit is substantially similar to the circuit shown in the RCA Television Service Data 1968 No. T20–S1, published by RCA Sales Corporation, Indianapolis, Ind.

What is claimed is:

1. In a circuit including deflection waveform generating means for supplying current to a deflection winding, a correction circuit comprising:
   - a first inductor,
   - a second inductor, and
   - means for coupling said first and second inductors in parallel relation with each other and in series relation with said deflection winding during at least a portion of a trace interval of each deflection cycle and for coupling only one of said inductors in series with said deflection winding during another portion of said deflection cycle.

2. A circuit as defined in claim 1 wherein said second inductor is a self-saturating saturable reactor.

3. A circuit as defined in claim 2 wherein said coupling means comprises a unidirectional conductive device serially coupled with said saturable reactor, the combination coupled in parallel with said first inductor.

4. A circuit as defined in claim 2 wherein said coupling means comprises a unidirectional conductive device serially coupled with said first inductor, the combination coupled in parallel with said saturable reactor.

5. In a television receiver deflection circuit, a linearity correction circuit comprising:
   - a linear inductor serially coupled to a deflection yoke for providing a yoke current path during at least one portion of each deflection cycle, and
   - a saturable reactor serially coupled to said yoke for providing a conduction path for yoke current during only another portion of each deflection cycle.

6. In a television deflection circuit wherein deflection current is provided to a yoke during a first portion of a trace interval by a first semiconductor device and wherein current is supplied to said yoke by a different semiconductor device during a second portion of a trace interval in each deflection cycle, a linearity correction circuit comprising:
   - a linear inductor serially coupled to said yoke,
   - a saturable reactor, and
   - switching means coupled to said saturable reactor for electrically coupling said reactor in series relation with said yoke and in parallel relation with said inductor during at least a portion of said trace interval.

7. A circuit as defined in claim 6 wherein said switching means includes a unidirectional conductive device serially coupled to said saturable reactor.

8. In a television receiver deflection circuit providing deflection current to a deflection yoke characterized in having a first polarity during a first portion of a trace interval of each deflection cycle and a second polarity during a second portion of each deflection cycle, a linearity correction circuit comprising:

a linear inductor, a saturable reactor, and switching means for coupling said inductor in parallel relation with at least a part of said saturable reactor, the combination coupled in series relation with said yoke during only a portion of each trace interval.

9. A circuit as defined in claim 8 wherein said saturable reactor includes a tap dividing said reactor into first and second parts.

10. A circuit as defined in claim 9 wherein said switching means comprises a unidirectional conductive device serially coupled to said saturable reactor, and wherein said linear inductor is coupled to said tap on said saturable reactor to provide a continuous current path for yoke current, said path defined by said linear inductor and said first part of said saturable reactor.

11. A circuit as defined in claim 8, wherein said switching means couples said inductor in parallel relation to said second part of said saturable reactor during only a portion of said trace interval.

12. A linearity correction circuit comprising the combination of:

a deflection waveform generator having a pair of terminals, a deflection yoke having first and second terminals, said first terminal coupled to one of said terminals of said deflection waveform generator, an inductor connected between said second terminal of said deflection yoke and a second terminal of said deflection waveform generator, and a saturable reactor and a unidirectional conductive device coupled in series between said second terminal of said deflection yoke and said second terminal of said deflection waveform generator, said unidirectional conductive device being poled for conducting during the latter portion of each trace interval of each deflection cycle.

* * * * *